Dec. 17, 1935.  E. E. HEWITT  2,024,643
FLUID PRESSURE BRAKE
Filed March 22, 1932
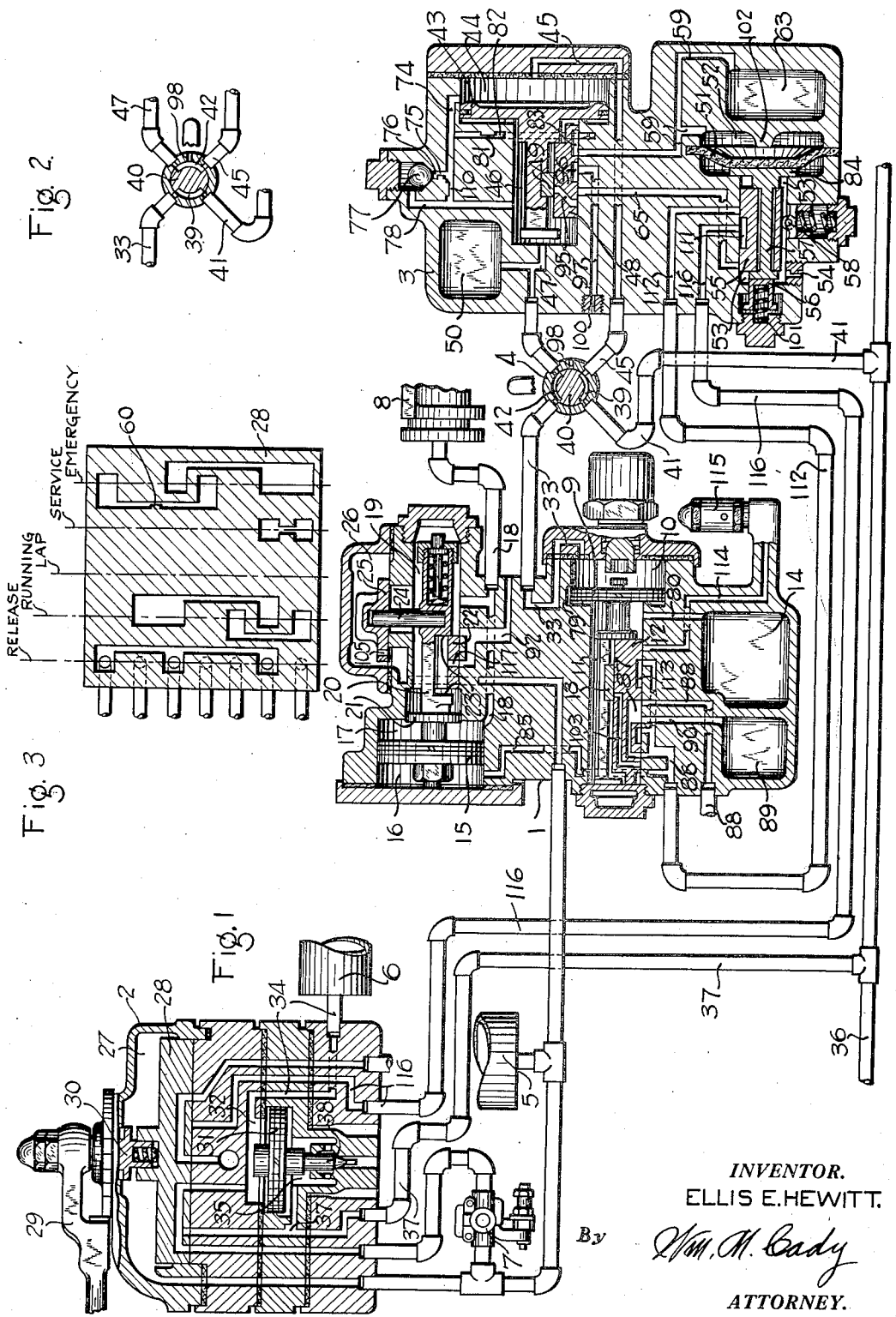
INVENTOR.
ELLIS E. HEWITT.
By Wm. M. Cady
ATTORNEY.

Patented Dec. 17, 1935

2,024,643

UNITED STATES PATENT OFFICE 2,024,643

FLUID PRESSURE BRAKE

Ellis E. Hewitt, Edgewood, Pa., assignor to The Westinghouse Air Brake Company, Wilmerding, Pa., a corporation of Pennsylvania Application March 22, 1932, Serial No. 600,405

13 Claims. (Cl. 303—47)

This invention relates to fluid pressure brakes, and more particularly to the type in which the brakes are applied by effecting a reduction in pressure in the brake pipe.

To effect an application of the brakes on a train, the usual brake valve device on the locomotive is turned to a brake applying position to cause a reduction in brake pipe pressure, which is first effective at the head end of the train. As a result, the brakes on the train apply serially from the front towards the rear end and set up a retardation which causes the slack in the train to run in which often results in excessive shock.

In the copending application Serial No. 517,660 filed February 24, 1931, by the applicant and Clyde C. Farmer and assigned to the assignee of this application, fluid pressure brake equipment is disclosed wherein means are provided for so delaying or holding back the application of brakes on the locomotive, that the inertia of the locomotive will tend to keep the slack in the train pulled out and thus avoid excessive shock. The equipment includes, in addition to the usual brake pipe, automatic brake valve device, feed valve device, main reservoir, equalizing reservoir, brake cylinder and distributing valve device for controlling the supply of fluid from the main reservoir to the brake cylinder, a hold-back valve device, which operates upon a reduction in brake pipe pressure at both service and emergency rates to delay operation of the equalizing valve device of the distributing valve device to effect an application of the brakes on the locomotives, for a predetermined time after the brake pipe pressure is reduced.

Means are provided for rendering the holdback valve device ineffective to retard the application of the locomotive brakes, but the moving valve parts of the hold-back valve device, which are subject to brake pipe pressure, move from release to application position each time the brake pipe pressure is reduced to effect an application of the brakes, regardless of whether the holdback valve device is effective or ineffective.

It is an object of this invention to provide a fluid pressure brake equipment embodying a hold-back valve device similar to that of the aforesaid application wherein the moving parts of the hold-back valve device normally subjected to, and operated by, variations in brake pipe pressure may be temporarily disconnected from the brake pipe and rendered inactive and inoperative to cause the application of the brakes on the locomotive to be delayed, when the brake pipe pressure is reduced to effect application of the brakes.

A further object of the invention is to provide a fluid pressure brake equipment embodying a hold-back valve device having the above noted characteristics, wherein the hold-back valve device may be so disconnected from the distributing valve device that the equalizing valve device of the distributing valve device will be directly operative by variations in brake pipe pressure, and therefore, cannot interfere with the application of the locomotive brakes when the hold-back valve device is rendered ineffective to retard the application of the locomotive brakes.

A further object of the invention is to provide a fluid pressure brake equipment embodying a hold-back valve device associated with a standard brake valve device and a standard distributing valve device, wherein a passage controlled by a valve of the hold-back valve device for supplying maintaining fluid from the brake valve device through the distributing valve device to the application cylinder thereof for maintaining the application valve device of the distributing valve device in application position during an emergency reduction in brake pipe pressure, is maintained open when the fluid operated valve parts of the hold-back valve device are disconnected from the brake pipe.

These and other objects that will be made apparent throughout the further description of the invention are attained by the fluid pressure brake equipment hereinafter described and illustrated in the accompanying drawing; wherein Fig. 1 is a diagrammatic view, mainly in section, of a locomotive brake equipment embodying features of the invention;

Fig. 2 is a diagrammatic view of a portion of the cut-out plug valve device shown in Fig. 1, but with the plug valve shown in cut-out position;

Fig. 3 is a development view showing diagrammatically the connection established in various positions of the brake valve device shown in Fig. 1.

As shown in the drawing, the locomotive brake equipment comprises a brake controlling valve device, such as a distributing valve device 1, an automatic brake valve device 2 for controlling the variations in pressure in the brake pipe, a hold-back valve device 3, a cut-out plug valve device 4, a main reservoir 5, an equalizing reservoir 6, a feed valve device 7, and a brake cylinder 8.

The distributing valve device comprises a casing containing the usual equalizing portion and application portion. The equalizing portion comprises a piston 9, having at one side a chamber 10 and at the other side a valve chamber 11 containing a main slide valve 12 and an auxiliary slide valve 13 adapted to be operated by said piston, the chamber 11 being in constant communication with a pressure chamber 14. The application portion of the distributing valve device comprises a piston 15 having at one side a cylinder 16 and at the other side a chamber 17 open to the brake cylinder 8 through a passage and pipe 18. Extending to the right from piston 15 and through a valve chamber 19 is a piston stem 20 having mounted thereon a baffle piston 21, separating chambers 17 and 19. An exhaust slide valve 22 is disposed in chamber 19 between face shoulders 23 on the stem 20 and is adapted to be operated thereby. Projecting upwardly from the stem 20 is a driving pin 24 operatively engaging an application slide valve 25 contained in a chamber 26.

The automatic brake valve device 2 comprises a casing having a chamber 27 containing a rotary valve 28 adapted to be turned to various controlling positions by a handle 29 operatively connected to said rotary valve by means of a stem 30. Disposed in the brake valve casing is the usual brake pipe discharge valve mechanism comprising an equalizing piston 31 having at one side a chamber 32 connected to the equalizing reservoir 6 through a passage and pipe 34. The equalizing piston 31 has at the other side a chamber 35 connected to the brake pipe 36 through passage and pipe 37, and containing a brake pipe discharge valve 38 adapted to be operated by said piston.

The hold-back valve device 3 comprises a control valve portion and a timing valve portion. The control valve portion comprises a piston 43 having at one side a chamber 44 communicating with the brake pipe 36 through a passage and pipe 45, cavity 39 in the plug valve 40 of the cut-out plug valve device 4 and pipe 41, and having at the other side a valve chamber 46 communicating with the equalizing piston chamber 10 of the distributing valve device 1 through passage and pipe 47, cavity 42 of the plug valve 40 and pipe and passage 33, and containing a main slide valve 48 and an auxiliary slide valve 49 adapted to be operated by said piston. A chamber or volume reservoir 50 is connected by passage 47 to chamber 46 for increasing the volume of said chamber.

The timing valve portion of the hold-back valve device 3 comprises a flexible diaphragm 51 mounted in the casing and having at one side a chamber 52 and at the other side a valve chamber 53 which is in constant communication with the atmosphere through choke plug 54.

The chamber 53 contains a slide valve 55 adapted to be operated by deflection of said diaphragm. Projecting into valve chamber 53 is a spring pressed member 56 adapted to engage the diaphragm stem 57 for opposing deflection of said diaphragm. The slide valve 55 is pressed into engagement with its seat by means of a spring pressed roller 58.

The diaphragm chamber 52 of the timing valve portion of the hold-back valve device 3 is connected to a passage 59 leading to the seat of the control valve slide valve 48 and to a timing reservoir 63.

Since the brake valve device and the distributing valve device are of the usual well known type and operate in the manner fully described in the above noted copending application, no specific description of the manner of operation will be given herein.

Fluid under pressure supplied to brake pipe 36 flows through pipe and passage 41, cavity 39 in the plug valve 40 and pipe and passage 45 to the control valve piston chamber 44 of the hold-back valve device 3. With the control piston 43 in its inner position, as shown in the drawing, fluid under pressure flows from chamber 44 through passage 74, choke 75, passage 76, past a ball check valve 77 and through passage 78 to the control valve chamber 46 and from thence through passage 47 to the reservoir 50, and through passage and pipe 47, cavity 42 in plug valve 40, and passage and pipe 33 to the equalizing piston chamber 10 of the distributing valve device 1. With the equalizing piston 9 in its release position, a feed groove 79 is uncovered which permits fluid under pressure to flow from piston chamber 10 to valve chamber 11 and from thence through passage 80 to pressure chamber 14. In this manner the pressure chamber 14, valve chamber 11, piston chamber 10, reservoir 50 and control valve chamber 46 are charged with fluid under pressure from the brake pipe.

Fluid under pressure also flows from passage 74 in the hold-back valve device through passage 82 having a restricted flow portion 81, cavity 83 in the control valve slide valve 48 and passage 59 to the timing valve diaphragm chamber 52 and also to the timing reservoir 63 so that said chamber and reservoir also become charged with fluid at brake pipe pressure. The pressure of fluid in diaphragm chamber 52 deflects diaphragm 51 to the left until the follower plate 84 on the diaphragm stem 57 engages the casing, in which position the spring pressed member 56 is moved to the depressed position shown in the drawing.

With the equalizing piston 9 and slide valves 12 and 13 of the distributing valve device 1 in the normal release position, shown in Fig. 1, the application cylinder 16 is open to the atmosphere through passages 85 and 86, cavity 87 in the main slide valve 12 and passage and pipe 88, said pipe being open to the atmosphere. The application chamber 89 in the distributing valve device is open through passage 90 to the vented cavity 87 in the main slide valve 12 and therefore is also normally at atmospheric pressure.

Instead of connecting the usual application cylinder pipe of the locomotive brake equipment directly to the engineer's brake valve, the distributing valve portion 112 and the brake valve portion 116 of the pipe are connected to passages leading to the seat of slide valve 55 of the timing valve portion of the hold-back valve device 3, so that communication through the application cylinder pipe is controlled by the slide valve 55.

In the improved fluid brake equipment shown in Fig. 1, the hold-back valve device 3, substantially similar in construction to that disclosed in the said copending application, is connected between the brake pipe 36 and the equalizing piston chamber 10 by means of the plug valve device 4 previously referred to, and the function of the hold-back valve device is to prevent a reduction in brake pipe pressure at a service or emergency rate from effecting a corresponding reduction in pressure in the equalizing chamber 10 until a predetermined time after the reduction in brake pipe pressure is initiated.

With the plug valve 40 in its cut-in position, when the brake pipe pressure is reduced to effect an application of the brakes, a corresponding reduction occurs in the control valve piston chamber 44 of the hold-back valve device 3. The rate of reduction in pressure in chamber 44 exceeds the capacity of the choke 110 to vent fluid under pressure from chamber 46 to chamber 44, to such an extent that a sufficient differential of pressure is obtained on the control piston 43 to shift that piston and slide valves 48 and 49 to application position, in which position connection is established from valve chamber 46, through port 95 in the main slide valve 48, to passage 65 which leads to the seat of the timing valve slide 55 and is normally lapped by that slide valve.

In application position of the control valve slide valve 48, passage 59 is connected through a cavity 96 to a passage 97 which is open to the atmosphere through a choke plug 100. This permits fluid under pressure to gradually flow from the diaphragm chamber 52 and timing reservoir 63 to the atmosphere at a rate governed by the flow area of choke plug 100. When the pressure of fluid in diaphragm chamber 52 is thus reduced to a predetermined degree, the pressure of spring 101 acting through member 56 shifts the stem 57 and slide valve 55 and deflects the diaphragm 51 to application position, in which the diaphragm engages a stop 102.

With the timing valve slide valve 55 in application position, passage 65 is uncovered and communication is established from valve chamber 53 to valve chamber 46 through passage 65, port 95 in the slide valve 48. The chamber 59 and equalizing piston chamber 10 of the distributing valve device are in communication with the valve chamber 46 and as a result fluid under pressure is permitted to flow from the equalizing piston chamber 10 and chamber 59 to the timing valve chamber 53 and from thence through the choke plug 54 to the atmosphere. This reduces the pressure in chamber 10 at a service rate and permits the pressure of fluid in valve chamber 11 to shift the piston 9 and slide valves 12 and 13 to service position for effecting operation of the brakes in the usual manner as follows. With the equalizing piston 9 and slide valves 12 and 13 in service position, port 103 is uncovered and registers with passage 86. Fluid pressure then flows to the application piston chamber 16 and moves the piston 15 to the right, bringing port 105 of the slide valve 25 into registry with valve chamber 19 and thereby permitting fluid under pressure to flow from the main reservoir 5 to the brake cylinder 8, the degree of brake cylinder pressure being determined in the well known manner by the rate of reduction of brake pipe pressure.

It will be noted from the foregoing that when a brake application is initiated by a reduction in brake pipe pressure, the application of the locomotive brake is delayed for a period of time which is governed by the time required for the pressure in the timing reservoir 63 and the connected diaphragm chamber 52 to blow down through the choke plug 100 in the hold-back valve device.

With the brake valve device in emergency position the brake valve portion 116 of the application cylinder pipe is connected to the rotary valve chamber 27 through a restricted port 60 in the rotary valve 28, which permits a limited flow of fluid under pressure to the said portion of the application cylinder pipe leading to the seat of the timing valve slide valve 55 in the hold-back valve device 3. When the slide valve 55 is moved to its right hand or application position for venting fluid under pressure from the equalizing piston chamber 10, fluid under pressure is supplied from the main reservoir 5 through passage 116, cavity 111 in said slide valve and passage and pipe 112 to passage 86 and from thence through passage 85 to the application piston chamber 16.

In order to release the brakes after an application of the brakes has been made, the brake valve device 2 is turned first to release position and then to running position to charge the brake pipe 36 in the usual manner. The resulting increase in brake pipe pressure shifts the control piston 43 and slide valves 48 and 49 to their normal or release positions shown in the drawing, in which fluid under pressure is supplied from the control piston chamber 44 to the valve chamber 46 through passage 74, choke 75, passage 76 and past the ball check valve 77 through passage 78. Fluid under pressure also flows from passage 74 through choke 81, passage 82, cavity 83 in the control slide valve 48 and passage 59 to the timing valve diaphragm chamber 52 and to the timing reservoir 63, thereby charging the diaphragm chamber 52 and reservoir 63. The pressure of fluid in diaphragm chamber 52 then shifts the slide valve 55 to its normal position shown in the drawing.

Fluid under pressure supplied to the control valve chamber 46 flows through passage 47 to chamber 59 and through pipe 47, cavity 42 in the plug valve 40, pipe and passage 33 to the equalizing piston chamber 10 of the distributing valve device. This increase in pressure in chamber 10 moves the equalizing piston 9 and slide valves 12 and 13 to release position, in which the feed groove 79 is opened by said piston so as to permit fluid under pressure to flow from piston chamber 10 to valve chamber 11 and thence through passage 89 to the pressure chamber 14 and thus charge said chamber with fluid at brake pipe pressure. In release position of the equalizing slide valve 12 the application cylinder 16 is open to the atmosphere through passages 85 and 86, cavity 87 in the slide valve 12, and passage and pipe 88, and the application piston 15 is returned to release position by the higher fluid pressure in the valve chamber 19. With the application piston 15 and exhaust valve 22 in release position, communication is established from the brake cylinder to the atmosphere through pipe and passage 18, valve chamber 19, port 717 in the exhaust valve 22 and passage 92, thereby causing the release of the brakes.

With the plug valve 40 in the cut-out position, the equalizing piston chamber 10 is subjected directly to brake pipe pressure and piston 9 responds to a reduction in brake pipe pressure in the usual manner to effect an application of the brakes without any delay period. With the plug valve 40 in the cut-out position, communication from the brake pipe to the control piston chamber 44 is interrupted.

In this position, cavity 42 registers with an atmospheric exhaust port 98, so that both the piston chamber 44 and the valve chamber 46 are vented to the atmosphere. The opposite sides of the piston 43 being subjected to atmospheric pressure while the plug valve 40 remains in its cut-out position, said piston will not be operated when a reduction in brake pipe pressure is effected.

If the piston 43 happens to be in its inner position, as shown in the drawing, when the plug valve 40 is moved to its cut-out position, the passage 59 being then connected through cavity 83 in slide valve 48 with passage 82, the chamber 52 and the timing reservoir 63 will be vented to the atmosphere with the piston chamber 44 and the valve chamber 46. If the piston 43 should be in its outer position, then passage 59 will be connected through cavity 96 in slide valve 48 with exhaust passage 97, so that the chamber 52 and the timing reservoir 63 will be vented to the atmosphere. When the pressure within the chamber 52 has blown down sufficiently, the spring 101 will force the stem 57 and slide valve 55 to the application position wherein the diaphragm 51 engages the stop 102, and the slide valve 55 will then remain in this position, so long as the plug valve 40 is maintained in its cut-out position.

With the slide valve 55 in the application position, the cavity 111 therein connects passages 112 and 116, thereby establishing communication from the seat of the rotary valve 28 of the brake valve device to the application cylinder 16, as previously described, so that fluid under pressure may be supplied to the application cylinder 16, when the handle of the brake valve device 2 is moved to emergency position, for maintaining fluid pressure in the application cylinder 16 against leakage during an emergency application of the brakes.

By reason of the provision of the plug valve device above described, the hold-back valve device 3 may be isolated from the brake pipe when it is desired to operate the fluid pressure brake equipment without the hold-back feature. When isolated, reduction in brake pipe pressure cannot effect movement of the control piston 43 and the timing valve diaphragm 51 and their associated valves. Since those operating parts remain stationary while the hold-back valve device is isolated, wear is reduced and the life of the parts is materially increased.

Since the brake pipe is at such time in direct communication with the equalizing piston chamber 10, the response of the equalizing piston to reductions in brake pipe pressure is immediate.

Summarizing, a fluid pressure brake equipment having the usual brake valve and distributing valve devices is provided with a hold-back valve device for delaying the application of the brakes on the locomotive for a predetermined time after service or emergency reductions in brake pipe pressure are initiated.

A plug valve device is provided which is adapted in its cut-in position to cut off the communication from the brake pipe to the equalizing piston chamber of the distributing valve device and at the same time render the hold-back valve device operative upon a reduction in brake pipe pressure to delay the reduction in fluid pressure on the equalizing piston. The period of time of the delayed action is determined by the time required for the fluid under pressure within a timing reservoir to blow down sufficiently to permit operation of a timing valve to an application position, wherein communication is established from the equalizing piston chamber to the atmosphere through a restricted passage which permits of reduction of fluid pressure within the equalizing chamber at a service rate.

When it is desired to operate the fluid pressure brake system in the usual manner without delaying the application of the brakes on the locomotive, the cut-out plug valve device 4 is turned to cut-out position, wherein a direct communication is established from the brake pipe to the equalizing piston chamber of the distributing valve device and the hold-back valve device is disconnected from the brake pipe so that the brake pipe pressure cannot influence or effect operation of the control valve piston or the timing valve.

With the cut-out plug valve device in the cut-out position the fluid pressure brake equipment operates in the usual manner, while the moving parts of the hold-back valve device remain stationary, the timing valve at this time being so positioned that communication from the maintaining port and passage of the brake valve device to the application cylinder of the application valve device throgh the application cylinder pipe is completed through a cavity in the timing valve. Therefore, with the brake valve device in emergency position, and the cut-out plug valve device in cut-out position, pressure may be maintained in the application cylinder for the usual purpose.

While I have disclosed but one embodiment of the invention, it is obvious that many changes, additions and omissions may be made in the construction disclosed without departing from the spirit of the invention.

Having now described my invention, what I claim as new and desire to secure by Letters Patent, is:

1. In a fluid pressure brake, the combination with a brake pipe, and a fluid pressure actuated valve device operative to effect an application of the brakes, of means responsive to a reduction in brake pipe pressure for effecting and controlling the operation of said valve device, said means including timing means for delaying the operation of said valve device until after the expiration of a predetermined time interval beginning with a reduction in brake pipe pressure, and a valve adapted when in one position to render said controlling means operative and when in another position to render said controlling means non-operative.

2. In a fluid pressure brake, the combination with a brake pipe and a fluid pressure actuated valve device operative to effect an application of the brakes, of valve means operably responsive to a reduction in brake pipe pressure for effecting the operation of said valve device, timing means adapted to be set in operation by the operation of said valve means for delaying the operation of said valve device until after the expiration of a predetermined time beginning with a reduction in brake pipe pressure, and means operable to render said valve device operative in response to a reduction in brake pipe pressure while rendering said valve means non-operative.

3. In a fluid pressure brake, the combination with a brake pipe and a fluid pressure actuated valve device operative upon a reduction in fluid pressure to effect an application of the brakes, of valve means operably responsive to a reduction in brake pipe pressure to effect such a reduction in fluid pressure as to effect the operation of said valve device, timing means adapted to be set in operation by the operation of said valve means for delaying the reduction in fluid pressure, whereby said valve device is operated, until after the expiration of a predetermined time beginning with a reduction in brake pipe pressure, and a valve adapted, when in one position, to establish communication between said valve device and said valve means, and also communication between said valve means and said brake pipe, whereby said valve means is rendered operative, said valve being adapted when in another position, to interrupt said communications and establish another communication between said brake pipe and said valve device whereby said valve means is rendered non-operative and said valve device is rendered responsive to brake pipe pressure reductions independently of said valve means.

4. In a fluid pressure brake, the combination with a brake pipe and a brake controlling valve device operative upon a reduction in fluid pressure for effecting an application of the brakes, of a valve means comprising a timing valve operative to a position for establishing a communication through which the fluid pressure on said valve device is reduced, and a control valve device for controlling the operation of the timing valve device operative upon a reduction in brake pipe pressure for effecting movement of the timing valve device to the said position, and a valve operative to a position for closing the said communication and for establishing a communication through which the fluid pressure on the said valve device is reduced with the brake pipe pressure.

5. In a fluid pressure brake, the combination with a brake pipe and a brake controlling valve device operative upon a reduction in fluid pressure for effecting an application of the brakes, of a valve means comprising a timing valve operative to a position for establishing a communication through which the fluid pressure on the said valve device is reduced, and a control valve device for controlling the operation of the timing valve device operative upon a reduction in brake pipe pressure for effecting movement of the timing valve device to the said position, and a valve operative to one position for establishing communication from the brake pipe to the said controlling valve device and operative to another position for closing both said communications and for establishing a communication through which the fluid pressure on the said valve device is reduced with the brake pipe pressure.

6. In a fluid pressure brake, the combination with a brake pipe and a brake controlling valve device operative upon a reduction in fluid pressure for effecting an application of the brakes, of a valve means comprising a timing valve device and a control valve device adapted to control a communication through which fluid pressure on the said valve device is reduced, and a valve for establishing a communication through which fluid pressure on the said valve device is reduced with the brake pipe pressure and operative to close the last said communication and to open the first said comunication.

7. In a fluid pressure brake, the combination with a brake pipe and a brake controlling valve device operative upon a reduction in fluid pressure for effecting an application of the brakes, of a valve means comprising a timing valve device and a control valve device for controlling a communication through which fluid pressure on the said valve device is reduced, the said control valve device and timing valve device being operative upon a reduction in brake pipe pressure to open said communication, and a valve operative to close said communication and to establish another communication through which fluid pressure on said valve device is reduced with the brake pipe pressure.

8. In a fluid pressure brake, the combination with a brake pipe and a brake controlling valve device operative upon a reduction in fluid pressure for effecting an application of the brakes, of a valve means comprising a timing valve device and a control valve device having a valve chamber, the said timing valve device and said control valve device being adapted to control a communication through which fluid pressure in the said valve chamber is reduced, and a valve having one position in which a communication is established through which fluid under pressure may flow from the said valve device to the said chamber and a position in which a communication is established through which fluid pressure on the said valve device is reduced with the brake pipe pressure.

9. In a fluid pressure brake, the combination with a brake pipe and a brake controlling valve device operative upon a reduction in fluid pressure for effecting an application of the brakes, of a valve means comprising a timing valve device and a control valve device having a valve chamber, the said timing valve device and said control valve device being adapted to control a communication through which fluid pressure in the said valve chamber is reduced and being operative upon a reduction in brake pipe pressure to open said communication, and a valve having one position in which a communication is established through which fluid under pressure may flow from the said valve device to the said chamber for reducing the fluid pressure on the said valve device and in which communication is established from the brake pipe to the said valve means, and another position in which the second and third said communications are closed and in which a communication is established through which the fluid pressure on the said valve device is reduced with the brake pipe pressure.

10. In a fluid pressure brake, the combination with a brake pipe, a brake controlling valve device comprising an application valve device operative upon an increase in fluid pressure for effecting an application of the brakes, an equalizing valve device operative upon a reduction in fluid pressure for controlling the supply of fluid to said application valve device, and a brake valve device having a communication through which said application valve device is supplied with fluid under pressure, of a hold-back valve device for controlling said communication and operative to a position for establishing a communication through which the fluid pressure on the said equalizing valve device is reduced, and to a position wherein the first said communication is open, a valve operative from one position in which it permits said second communication to be established to a second position for closing the second said communication and for establishing a communication through which fluid pressure on said equalizing valve device is reduced with the brake pipe pressure, and means for automatically moving the hold-back valve device to its second said position when the said valve is moved to its said second position.

11. In a fluid pressure brake, in combination, a brake pipe, a brake controlling valve device operative upon a reduction in fluid pressure for effecting an application of the brakes, valve means operative to establish a communication through which a reduction in fluid pressure on said valve device is effected, a control valve device operated upon a reduction in brake pipe pressure to cause said valve means to operate, timing means set in operation upon the operation of said control valve device for staying the operation of said valve means until a predetermined time has expired after the operation of said control valve device, and a valve operative to a position for closing said communication and for establishing a communication through which a reduction in fluid pressure for effecting the operation of said valve device may be caused independently of said valve means and control valve device.

12. In a fluid pressure brake, in combination, a brake pipe, a brake controlling valve device operated upon a reduction in fluid pressure for effecting an application of the brakes, a movable abutment normally subject on opposite sides to fluid under pressure in balanced condition and movable in response to a reduction in the pressure of fluid on one side occasioned by a reduction in brake pipe pressure, valve means operated upon movement of said abutment in response to a reduction in brake pipe pressure, for establishing a communication through which a reduction in fluid pressure for effecting the operation of said valve device is caused, and a valve adapted in one position to permit said communication to be established and in another position to close said communication and establish communications for venting fluid under pressure from opposite sides of said abutment to render said abutment non-movable.

13. In a fluid pressure brake, in combination, a brake pipe, an application valve device operated upon an increase in fluid pressure in a chamber for effecting an application of the brakes, a brake valve device operative to supply fluid under pressure to said chamber, an equalizing valve device operated upon a reduction in fluid pressure for supplying fluid under pressure to said chamber, means operable upon effecting a reduction in brake pipe pressure and after a predetermined time interval for venting fluid under pressure from said equalizing valve device, said means including valve means operative to establish communication through which said brake valve device supplies fluid to said chamber, and a valve operable to a position for rendering said means non-operative in response to a reduction in brake pipe pressure and for effecting the operation of said valve means to establish said communication.

ELLIS E. HEWITT.